(12) United States Patent
Kobayashi

(10) Patent No.: US 9,353,703 B2
(45) Date of Patent: May 31, 2016

(54) GAS GENERATOR

(71) Applicant: DAICEL CORPORATION, Osaka-shi, Osaka (JP)

(72) Inventor: Tomoharu Kobayashi, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 372 days.

(21) Appl. No.: 13/800,859

(22) Filed: Mar. 13, 2013

(65) Prior Publication Data

US 2013/0283760 A1    Oct. 31, 2013

Related U.S. Application Data

(60) Provisional application No. 61/639,007, filed on Apr. 26, 2012.

(30) Foreign Application Priority Data

Apr. 25, 2012    (JP) .................................. 2012-99480

(51) Int. Cl.
*B60R 21/26*        (2011.01)
*B01D 45/08*       (2006.01)
(Continued)

(52) U.S. Cl.
CPC ............... *F02G 3/00* (2013.01); *B60R 21/2644* (2013.01); *F42B 3/04* (2013.01); *B60R 2021/26029* (2013.01)

(58) Field of Classification Search
CPC ................... B60R 21/2644; B60R 2021/2612; F02C 3/20; F02K 9/26; F02K 9/95
USPC ........................................... 280/736; 102/530
See application file for complete search history.

(56) References Cited

U.S. PATENT DOCUMENTS 5,458,371 A    10/1995    Fulmer et al.
5,613,706 A    3/1997    Parker et al.
(Continued)

FOREIGN PATENT DOCUMENTS

CN    102282048 A    12/2011
DE    202 19 899 U1    5/2003
(Continued)

OTHER PUBLICATIONS

JP,2007-131254,A english translation.*
(Continued)

*Primary Examiner* — Kenneth Bomberg
*Assistant Examiner* — Anthony Ayala Delgado
(74) *Attorney, Agent, or Firm* — Birch, Stewart, Kolasch & Birch, LLP

(57) ABSTRACT

A gas generator includes a housing, an inner cylindrical member defining an ignition chamber therein and a combustion chamber outside, an ignition device disposed inside the ignition chamber, a solid gas generating agent charged in the combustion chamber, the inner cylindrical member including, a plurality of nozzles provided in a circumferential wall to communicate the ignition chamber with the combustion chamber, a guide member provided at least in the outer side or the inner side of the circumferential wall, so that combustion products from the ignition chamber is discharged from the nozzles and guided towards a bottom plate of the housing, the combustion chamber defined by the circumferential wall of the inner cylindrical member and the circumferential wall portion of the housing, an outlet from the inner cylindrical member being formed closer to the bottom plate than to the gas discharge port.

16 Claims, 5 Drawing Sheets

(51) Int. Cl.
*F02G 3/00* (2006.01)
*B60R 21/264* (2006.01)
*F42B 3/04* (2006.01)

(56) References Cited

U.S. PATENT DOCUMENTS

| | | | |
|---|---|---|---|
| 6,213,501 B1 | 4/2001 | Hock | |
| 6,227,565 B1* | 5/2001 | McFarland et al. | 280/736 |
| 6,412,815 B1 | 7/2002 | Nakashima et al. | |
| 2004/0124618 A1 | 7/2004 | Schonhuber et al. | |
| 2007/0046005 A1* | 3/2007 | Hanano et al. | 280/736 |
| 2011/0193330 A1 | 8/2011 | Kobayashi et al. | |

FOREIGN PATENT DOCUMENTS

| | | |
|---|---|---|
| EP | 1331143 A1 | 7/2003 |
| EP | 2 380 786 A1 | 10/2011 |
| JP | 3038714 U | 6/1997 |
| JP | 2007-131254 A | 5/2007 |
| JP | 2012-61961 A | 3/2012 |
| WO | WO 00/18618 A1 | 4/2000 |
| WO | WO 2010/082682 A1 | 7/2010 |
| WO | WO 2010/084899 A1 | 7/2010 |

OTHER PUBLICATIONS

International Search Report and Written Opinion issued in International Application No. PCT/JP2013/057334 on Jun. 21, 2013.

Japanese Office Action, dated Jan. 5, 2016, for Japanese Application No. 2012-099480 (with English translation).

* cited by examiner

GAS GENERATOR

This nonprovisional application claims priority under 35 U.S.C. §119(a) to Patent Application No. 2012-99480 filed in Japan on 25 Apr. 2012 and 35 U.S.C. §119(e) to U.S. Provisional application No. 61/639,007 filed on 26 Apr. 2012, which are incorporated by reference.

BACKGROUND OF INVENTION

1. Field of Invention

The present invention relates to a gas generator for a restraining device such as an airbag system for a vehicle.

2. Description of Related Art

A gas generator is used in an airbag apparatus and the like of a vehicle in order to actuate a restraining device. As such a gas generator, a pyrotechnic gas generator using a solid gas generating agent, a stored-type gas generator using pressurized gas, and a hybrid gas generator using both a solid gas generating agent and pressurized gas, are known. The pyrotechnic gas generator has a mechanism in which combustion gas is generated by actuating an ignition device and burning the gas generating agent charged in a housing. Therefore, the gas generating agent needs to be reliably and promptly ignited by the ignition device and burned. The ignition/combustion performance of the gas generating agent has an impact on the performance of the pyrotechnic gas generator.

As to the restraining device, the time from when a collision of a vehicle is detected till when the restraining device is actuated is extremely short. The pyrotechnic gas generator needs to facilitate ignition or combustion of the gas generating agent because discharge of combustion gas has to be started or ended immediately after the actuation of the ignition device.

It is known to adjust the positions, the number and the opening surface area of communication nozzles, that communicate an ignition chamber accommodating an ignition device and a combustion chamber charged with a gas generating agent. However, there remains room to investigate how combustion products (high-temperature gas and flame), which are generated from the ignition device, should act on the gas generating agent after being discharged to the combustion chamber through the communication nozzles (i.e., how the combustion products flow inside the combustion chamber).

In the inflator 100 disclosed in U.S. Pat. No. 5,458,371, the diffuser cover 104 and the annular base 106 are combined to form a housing.

An inner cylinder 120 provided with an ignition chamber wall hole (an ignition port) 130 is disposed inside the housing, wherein an internal space and an external space of the inner cylinder 120 are communicated with each other by the ignition chamber wall hole 130.

The ignition chamber wall hole 130 is formed to face a circular annular base 106 (i.e., downward) in the combustion chamber, so that combustion products that are generated from an ignition squib 126 or an enhancing agent (a charge) 128 are directed in the direction of the arrow shown in FIGS. 1-3 and brought into contact with a gas generant material 108. Note that a filter 134 surrounds the gas generant material 108.

According to JP-A No. 2007-131254, flow of gas discharged from the inside of a cylindrical partition wall 19 is divided into either ends in the axial direction by the cylindrical partition wall 19 partitioning the combustion chamber, and the combustion gas is caused to pass through a top filter and a bottom filter. The obliquely protruding openings 22a, 22b are formed in a circumferential wall portion of the cylindrical partition wall 19, in order to restrict the direction of gas flow.

SUMMARY OF INVENTION

The first aspect of the present invention provides a gas generator, including:
a housing including,
a first shell having a top plate and a circumferential wall portion and
a second shell having a bottom plate and a circumferential wall portion;
a gas discharge port formed in the top plate or the circumferential wall portion of the first shell;
an inner cylindrical member disposed inside the housing, and defining an ignition chamber therein and a combustion chamber in an outside thereof;
an ignition device disposed inside the ignition chamber; and
a solid gas generating agent charged in the combustion chamber to generate combustion gas,
the inner cylindrical member including,
an opening at one end, which is closed,
an opening at the other end, which is closed by the ignition device attached thereto,
a plurality of nozzles provided in a circumferential wall of the inner cylindrical member to communicate the ignition chamber with the combustion chamber,
a guide member provided at least in an outer side or an inner side of the circumferential wall, so that combustion products generated inside the ignition chamber are discharged from the nozzles and guided towards the bottom plate of the second shell;
the combustion chamber including,
a radially inside portion defined by the circumferential wall of the inner cylindrical member and
a radially outside portion defined by at least the circumferential wall portion of the second shell, and
an outlet, for combustion products discharged from the inner cylindrical member during actuation, being formed closer to the bottom plate than to the gas discharge port.

The second aspect of the present invention provides, a gas generator including
a housing including,
a first shell having a top plate and a circumferential wall portion and
a second shell having a bottom plate and a circumferential wall portion;
a gas discharge port formed in the top plate or the circumferential wall portion of the first shell;
an inner cylindrical member disposed inside the housing, and defining an ignition chamber therein and a combustion chamber in an outside thereof,
an ignition device disposed inside the ignition chamber; and
a solid gas generating agent charged in the combustion chamber to generate combustion gas,
the inner cylindrical member including,
an opening at one end, which is positioned in a side of the top plate side and closed,
an opening at the other end, which is closed by the ignition device attached thereto,
a plurality of nozzles provided in a circumferential wall of the inner cylindrical member to communicate the ignition chamber with the combustion chamber, a guide member provided at least in an outer side or an inner side of the circumferential wall, so that combustion products generated inside the ignition chamber are discharged from the nozzles and guided towards the bottom plate of the second shell;

the combustion chamber including, a radially inside portion defined by the circumferential wall of the inner cylindrical member and a radially outside portion defined by an outer cylindrical member, the outer cylindrical member being arranged to form a cylindrical gap between the outer cylindrical member and the circumferential wall portion of the housing including the circumferential wall portions of the first shell and the second shell;

the cylindrical gap being communicated with the gas discharge port, a first communication path formed between the outer cylindrical member and the top plate, communicating the combustion chamber with the cylindrical gap, an outlet, for combustion products discharged from the inner cylindrical member during actuation, being formed closer to the bottom plate than to the first communication path.

BRIEF DESCRIPTION OF THE DRAWINGS

The present invention will become more fully understood from the detailed description given hereinbelow and the accompanying drawings which are given byway of illustration only, and thus are not limitative of the present invention and wherein.

DETAILED DESCRIPTION OF INVENTION

In U.S. Pat. No. 5,458,371, it is considered that combustion products flows in the direction of the arrow shown in FIGS. 1-3. Consequently, the gas generant material in the vicinity of the ignition chamber wall hole 130 is burned first, and thus generated combustion gas passes through the filter and can easily flow in a radial direction (i.e., radially outside).

For this reason, unburned gas generant material present above the flowing combustion gas cannot be burned easily, and therefore the entire gas generant material 108 cannot be burned promptly. In other words, combustion gas, which is generated from the initially burned gas generant material, cannot be used effectively, and the amount of explosive used in the ignition device needs to be increased. In view of this, there is room for improvement.

In terms of making effective use of the filters, in JP-A No. 2007-131254, the cylindrical partition wall 19 is used in order to restrict flow of the combustion gas so that the combustion gas can pass through the filters twice. The enhancing nozzle formed in the inner cylinder is applied to a conventional gas generator, which leaves room for improvement as described above.

The present invention provides a gas generator in which ignition performance and combustion performance of the entire gas generating agent in a combustion chamber is improved.

The present invention provides a gas generator which improves ignition performance and combustion performance of the entire gas generating agent in a combustion chamber.

In a housing, an inner cylindrical member provided with a nozzle is disposed, and the inside thereof is an ignition chamber. A guide member is provided at the nozzle, so that combustion products generated in the ignition chamber are discharged toward a bottom plate. Thereby, ignition performance of the entire gas generating agent in a combustion chamber is enhanced.

In the gas generator with the first aspect of the prevent invention, when combustion products, which are generated inside the inner cylindrical member (the ignition chamber) by actuation of the ignition device, are discharged from the plurality of nozzles provided at the circumferential wall of the inner cylindrical member, the combustion products are discharged in a specific direction (toward the bottom plate of the second shell) by the guide member provided at the inner cylindrical member.

Figure 1:
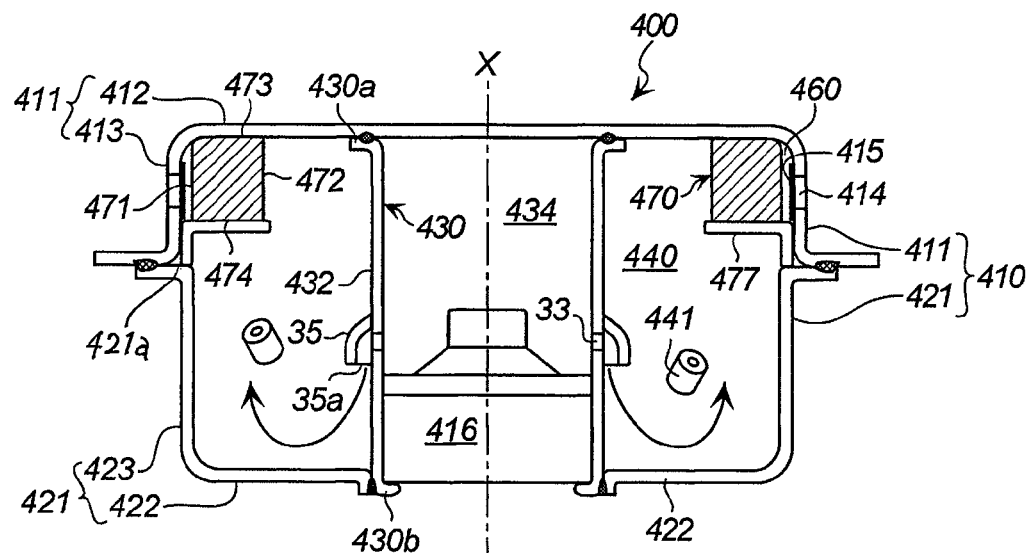
FIG. 1 shows a cross-sectional view in the central axis X direction of the gas generator of the present invention.

The specific direction (the direction toward the bottom plate of the second shell) can be a direction that is substantially parallel to the central axis of the gas generator (the central axis X shown in FIG. 1). For example, the specific direction can be a perpendicular direction or within an angle of less than 5° from the perpendicular direction when the gas generator is fixed horizontally. In other words, the combustion products generated in the ignition chamber are guided to the bottom plate of the housing in the combustion chamber by the guide member and further flow in the radial direction (radially outward).

The guide member is formed at least in the outside or the inside of the inner cylindrical member.

When the guide member is formed in the outer side of the circumferential wall of the inner cylinder, an opening defined by an outer circumferential wall of the inner cylindrical member and a distal portion of the guide member serves as an outlet for combustion products discharged from the inner cylindrical member during actuation.

The vertical location of the outlet for the combustion products can be adjusted by increasing or reducing the length of the guide member, regardless of the position of the nozzles.

When the guide member is formed in the inner side of the inner cylindrical member, the nozzles serve the outlet for combustion products discharged from the inner cylindrical member during actuation.

Because the outlet for combustion products (the opening or the nozzles) is formed closer to the bottom plate than to the gas discharge port, there is a difference in height between the outlet and the gas discharge port.

As shown in FIG. 1 of U.S. Pat. No. 5,458,371, the ignition chamber wall hole 130 is formed obliquely downward in the inner cylinder 120. Therefore, when combustion products are discharged in the direction of the arrow shown in FIG. 1, the gas generant material 108 provided in the region abutting against the inner cylinder 120 is in a dead space, and therefore, sufficient ignition and combustion performances are not obtained for the entire gas generating agent in the combustion chamber. Moreover, it is difficult to obliquely perforate the inner cylinder to form the ignition chamber wall hole.

However, in the gas generator according to the first aspect of the present invention, combustion products flow radially outward from the circumferential wall of the inner cylindrical member after being discharged toward the bottom plate along the circumferential wall of the inner cylindrical member (the direction along the central axis) by the guide member.

Therefore, the solid gas generating agent charged in the combustion chamber starts burning in the vicinity of the bottom plate, as well as in the vicinity of the outlet.

In addition, the gas discharge port is formed in the top plate or the circumferential wall portion of the first shell, and because there is a difference in height between the gas discharge port and the outlet of combustion products (the opening or nozzles), combustion products and high-temperature gas generated from the gas generating agent flow from the bottom plate toward the top plate along the circumferential wall portions of the second shell and the first shell (the direction of the gas discharge port).

Consequently, combustion products and the high-temperature gas flow toward the unburned gas generating agent present in the vicinity of the top plate, improving the ignition performance and the combustion performance of the entire gas generating agent in the combustion chamber.

The guide member rectifies a flow of combustion products, which are discharged in the radially outward direction through the nozzles, to flow toward the bottom plate of the housing, and is formed in the outer side or the inner side of the circumferential wall of the inner cylindrical member but may be formed on both sides. The guide member may be formed integrally with the inner cylindrical member or formed by a separate member.

The guide member may be formed on each of the plurality of nozzles, or a single guide member may be formed for the plurality of nozzles.

The inner cylindrical member is closed at an opening of one end, which is fixed to the top plate of the housing, or closed with a separate member (a cup member may be used). The inner cylindrical member may be disposed concentrically with the housing or disposed eccentrically to the central axis of the housing.

According to the gas generator with the second aspect of the present invention, when combustion products, which are generated inside the inner cylindrical member (the ignition chamber) by actuation of the ignition device, are discharged from the plurality of nozzles provided on the circumferential wall of the inner cylindrical member, the combustion products are discharged in a specific direction (toward the bottom plate of the second shell) by the guide member provided at the inner cylindrical member.

The specific direction (the direction toward the bottom plate of the second shell) can be a direction that is substantially parallel to the central axis of the gas generator (the central axis X shown in FIG. 1). For example, the specific direction can be a perpendicular direction or within an angle of less than 5° from the perpendicular direction when the gas generator is fixed horizontally. In other words, the combustion products generated in the ignition chamber are guided to the bottom plate of the housing in the combustion chamber by the guide member and further flow in the radial direction (radially outward).

The guide member is formed at least in the outside or the inside of the inner cylindrical member.

When the guide member is formed in the outer side of the circumferential wall of the inner cylindrical member, an opening defined by an outer circumferential wall of the inner cylindrical member and a distal portion of the guide member serves as an outlet for combustion products discharged from the inner cylindrical member during actuation.

The vertical location of the outlet for combustion products can be adjusted by increasing or reducing the length of the guide member, regardless of the position of the nozzles.

When the guide member is formed in the inner side of the inner cylindrical member, each of the nozzles serves as the outlet for combustion products discharged from the inner cylindrical member during actuation.

In FIG. 1 of U.S. Pat. No. 5,458,371, the ignition chamber wall hole 130 is formed obliquely downward in the inner cylinder 120. Therefore, when combustion products are discharged in the direction of the arrow shown in FIG. 1, the gas generant material 108 provided in the region abutting against the inner cylinder 120 is in a dead space, and therefore, sufficient ignition and combustion performances are not obtained for the entire gas generating agent in the combustion chamber. Moreover, it is difficult to obliquely perforate the inner cylinder to form the ignition chamber wall hole.

However, in the gas generator according to the second aspect of the present invention, combustion products flow radially outward from the circumferential wall of the inner cylindrical member after being discharged toward the bottom plate along the circumferential wall of the inner cylindrical member (the direction along the central axis) by the guide member.

Therefore, the solid gas generating agent charged in the combustion chamber starts burning in the vicinity of the bottom plate, as well as in the vicinity of the outlet.

In addition, the combustion chamber and the cylindrical gap are communicated with each other only by the first communication path formed between the outer cylindrical member and the top plate, and the outlet (the opening or the nozzles) through which combustion products are discharged from the inner cylindrical member during actuation is formed closer to the bottom plate than to the first communication path.

Due to the difference in height between the first communication path and the outlet of combustion products, combustion products and high-temperature gas generated from the gas generating agent flow from the bottom plate toward the top plate (toward the first communication path) along the outer cylindrical member.

Consequently, combustion products and high-temperature gas flow toward the unburned gas generating agent present in the vicinity of the top plate, thereby improving the ignition performance and the combustion performance of the entire gas generating agent in the combustion chamber.

In the inner cylindrical member, an opening at an end is closed by being fixed to the top plate of the housing or closed with a separate member (a cup member may be used). The inner cylindrical member may be disposed concentrically with the housing or disposed eccentrically to the central axis of the housing.

It is preferable in the second aspect of the present invention, that the gas generator is provided, wherein the outer cylindrical member has a large-diameter cylindrical wall portion and a small-diameter cylindrical wall portion with an outer diameter smaller than an outer diameter of the large-diameter cylindrical wall portion, the large-diameter cylindrical wall portion has an outer circumferential surface abutting against the circumferential wall portion of the second shell, and the small-diameter cylindrical wall portion has an opening abutting against the top plate, the cylindrical gap is formed between the small-diameter cylindrical wall portion and at least the circumferential wall portion of the first shell, and the first communication path is formed by a plurality of communication holes formed in a vicinity of the opening of the small-diameter cylindrical wall portion.

Using the outer cylindrical member of this shape can not only secure the first communication path but also form the cylindrical gap.

It is preferable in the second aspect of the present invention, that the gas generator is provided, wherein the outer cylindrical member has a large-diameter cylindrical wall portion and a small-diameter cylindrical wall portion with an outer diameter smaller than an outer diameter of the large-diameter cylindrical wall portion, the large-diameter cylindrical wall portion has an outer circumferential surface abutting against the circumferential wall portion of the second shell, and the small-diameter cylindrical wall portion has an opening abutting against the top plate, the cylindrical gap is formed between the small-diameter cylindrical wall portion and at least the circumferential wall portion of the first shell, and the first communication path is formed by a communication hole defined by a plurality of concave portions and the top plate, the concave portions being formed by denting the circumferential wall at the opening of the small-diameter cylindrical wall portion in a height direction.

Using the outer cylindrical member of this shape can not only secure the first communication path but also form the cylindrical gap.

It is preferable in the second aspect of the present invention, that the gas generator is provided, wherein the outer cylindrical member has a large-diameter cylindrical wall portion and a small-diameter cylindrical wall portion with an outer diameter smaller than an outer diameter of the large-diameter cylindrical wall portion, the large-diameter cylindrical wall portion has an outer circumferential surface abutting against the circumferential wall portion of the second shell, and the small-diameter cylindrical wall portion has an opening facing the top plate with a space therebetween, the cylindrical gap is formed between the small-diameter cylindrical wall portion and at least the circumferential wall portion of the first shell, and the first communication path is formed by a gap between the opening of the small-diameter cylindrical wall portion and the top plate of the first shell.

Such an arrangement of the outer cylindrical member can not only secure the first communication path but also form the cylindrical gap.

It is preferable in the second aspect of the present invention, that the gas generator is provided, wherein an annular filter is disposed in a side of the top plate inside the combustion chamber, the annular filter has an outer circumferential surface abutting against the outer cylindrical member, an inner circumferential surface abutting against the inner cylindrical member, one of annular surfaces abutting against the top plate, and the other of the annular surfaces facing the combustion chamber, and the combustion chamber and the cylindrical gap are communicated with each other by the annular filter and the first communication path.

Combustion gas generated in the combustion chamber enters the cylindrical gap after passing through the annular filter and the first communication path, and is then discharged from the gas discharge port. As a result, the combustion gas can be filtered and cooled. The combustion gas passing through the first communication path collides with an inner surface of the housing, enhancing the particulate collecting effect.

It is preferable in the second aspect of the present invention, that the gas generator is provided, wherein a substantially annular member is disposed in a side of the top plate inside the combustion chamber, the substantially annular member has an annular bottom surface provided with a plurality of communication holes, an external annular wall surface formed in an outer circumference of the substantially annular member, and an internal annular wall surface formed in an inner circumference thereof, the substantially annular member is fitted such that the external annular wall surface abuts against the outer cylindrical member, the internal annular wall surface faces the circumferential wall of the inner cylindrical member, and the annular bottom surface faces the combustion chamber, the substantially annular member is disposed such that an annular space surrounded by the top plate, the external annular wall surface, the annular bottom surface and an inner cylindrical container is formed, and the combustion chamber and the cylindrical gap are communicated with each other by a second communication path formed by the communication holes of the substantially annular member, the annular space and the first communication path.

Combustion gas generated in the combustion chamber enters the cylindrical gap after passing through the second communication path, the annular space and the first communication path in this order, and is discharged from the gas discharge port.

This increases the number of times that the combustion gas collides with the inner surface of the housing, enhancing the effects of cooling the combustion gas and collecting particulate.

It is preferable in the second aspect of the present invention, that the gas generator is provided, wherein a substantially annular member is disposed in a side of the top plate inside the combustion chamber, the substantially annular member has an annular bottom surface provided with a plurality of communication holes, and an external annular wall surface formed in an outer circumference of the substantially annular member, the substantially annular member is fitted such that the external annular wall surface abuts against the outer cylindrical member and the annular bottom surface faces the combustion chamber, and the substantially annular member is disposed such that an annular space is formed, surrounded by the top plate, the external annular wall surface, the annular bottom surface and an inner cylindrical member, and the combustion chamber and the cylindrical gap are communicated with each other by a second communication path formed by the communication holes of the substantially annular member, the annular space and the first communication path.

The combustion gas generated in the combustion chamber enters the cylindrical gap after passing through the second communication path, the annular space, and the first communication path in this order, and is discharged from the gas discharge port.

This increases the number of times that the combustion gas collides with the inner surface of the housing, enhancing the effects of cooling the combustion gas and collecting particulate.

It is preferable in the first and second aspects of the present invention, that the gas generator is provided, wherein the guide member is a cover member that protrudes downward from the outer side of the circumferential wall of the inner cylindrical member so as to cover the nozzles from above and outside. The vertical position of the outlet for combustion products is adjusted, in the direction of the central axis of the housing, as X shown in FIG. 1, by increasing or reducing the axial length of the guide member, without changing the positions of the nozzles.

By such a cover member, combustion products are discharged securely from the inner cylindrical member toward the bottom plate. Although protruding to the combustion chamber, the cover member may cover only the nozzles formed on the circumferential wall of the inner cylindrical member from outside. For example, the cover member may cover both the upper side (the top plate side) and the circumference regarding the nozzles. This cover member can be formed by making, on the circumferential wall of the inner cylindrical member, an incision extending in the circumferential direction, and then extruding the upper side of the incision from the inside of the inner cylindrical member toward the outside.

It is preferable in the first and second aspects of the present invention, that the gas generator is provided, wherein the guide member is a cover member that protrudes upward in the inside of the circumferential wall of the inner cylindrical member so as to cover the nozzles from below and inside.

By such a cover member, combustion products are discharged securely from the inner cylindrical member toward the bottom plate.

Furthermore, by providing the cover member inside the inner cylindrical member, charging of the solid gas generator in the combustion chamber can be facilitated, compared to the case where the cover member is provided outside of the inner cylindrical member. Although protruding to the ignition chamber, the cover member may cover only the nozzles formed on the circumferential wall of the inner cylindrical member from inside.

For example, the cover member may cover both the lower side (the bottom plate side) and circumference regarding the nozzles. This cover member can be formed by making, on the circumferential wall of the inner cylindrical member, an incision extending in the circumferential direction, and then pushing the lower side of the incision from the outside of the inner cylindrical member into the inside.

It is preferable in the first and second aspects of the present invention, that the gas generator is provided, wherein the guide member is a cylindrical cover member placed around the inner cylindrical member so as to cover the nozzles from above and outside, the cylindrical cover member has an annular fixing portion to be fixed to the circumferential wall of the inner cylindrical member and an enlarged-diameter portion extended outward from the annular fixing portion, and the annular fixing portion is fixed above the nozzles, and the enlarged-diameter portion covers the nozzles from above and outside.

By such a cover member, combustion products are discharged securely from the inner cylindrical member toward the bottom plate.

The manufacture itself of the gas generator becomes easier than when providing the cover member in the inner cylindrical member.

An opening of the inner cylindrical member may be fixed to the top plate of the first shell and the inner cylindrical member may be disposed concentrically with the housing or disposed eccentrically to the central axis of the housing.

The inner cylindrical member may be fixed to the top plate of the first shell or disposed away from the top plate.

The inner cylindrical member may be a cylinder whose opening at one end is closed by a lid.

The plurality of nozzles on the circumferential wall of the inner cylindrical member in each of the inventions described above may be formed in a single line or in a plurality of lines in the circumferential direction.

When forming a plurality of lines of the nozzles, it is preferred that, by taking into consideration workability of nozzles, the nozzles be disposed in a staggered manner (zig zag in the circumferential direction) so as not to overlap with each other in the axial direction.

The nozzles may be closed by a seal tape form outside or may not be closed. When not closed, the nozzles may be made smaller in diameter than a size of the solid gas generating agent charged inside the combustion chamber.

The ignition device that is disposed in the ignition chamber in each of the invention described above may include only a known electric igniter or a combination of a known electric igniter and a known gas generating agent or a transfer charge.

The gas generator according to the present invention can improve the ignition performance and the combustion performance of the entire gas generating agent in the combustion chamber.

Embodiments Of Invention (1) Gas Generator of FIG. 1

An outer shell container of a gas generator 400 is formed by a housing 410.

The housing 410 includes a first shell 411 having a top plate 412 and a circumferential wall portion 413, and a second shell 421 having a bottom plate 422 and a circumferential wall portion 423.

The first shell 411 and the second shell 421 are welded and integrated with each other at a contact portion between flange portions formed at the openings of the respective first and second shells. An annular step surface 421a is formed around the contact portion between the first shell 411 and the second shell 421.

The first shell 411 has a gas discharge port 414 in its circumferential wall portion 413 in the vicinity of the top plate 412. The gas discharge port 414 is closed with a metallic seal tape 415 from the inside.

An inner cylindrical member 430 is disposed in the housing 410 so as to be concentric with the central axis X of the housing.

In the inner cylindrical member 430, an opening at one end (a short flange portion) 430a is welded and fixed to the top plate 412, and is thereby closed. An opening at the opposite end (an inwardly bent portion) 430b is welded and fixed to a peripheral edge of a hole formed in a central portion of the bottom plate 422 of the second shell, and is thereby closed.

The inside of the inner cylindrical member 430 is an ignition chamber 434. The ignition chamber 434 accommodates an igniter 416 that has been inserted from the opening at the opposite end. The remaining space is charged with a gas generating agent (a transfer charge), not shown in the drawing.

The igniter (an igniter collar) 416 is fixed by the inwardly bent portion 430b.

A plurality of nozzles 33 are formed in the circumferential wall 432 of the inner cylindrical member 430.

The plurality of nozzles 33 are formed in a position facing (radially opposite to) the circumferential wall portion 423 of the second shell, in a staggered or zig zag manner at equal intervals in a circumferential direction. Therefore, there is a difference in height between the position of the gas discharge port 414 and the position of nozzles 33 in the central axis X direction.

Further, a guide member 35 shown in FIG. 1 is formed on the circumferential wall 432. The guide member 35 shown in FIG. 1 may be same as a guide member 35 of an inner cylindrical member 30 shown in (a) in FIG. 4.

Figure 4:
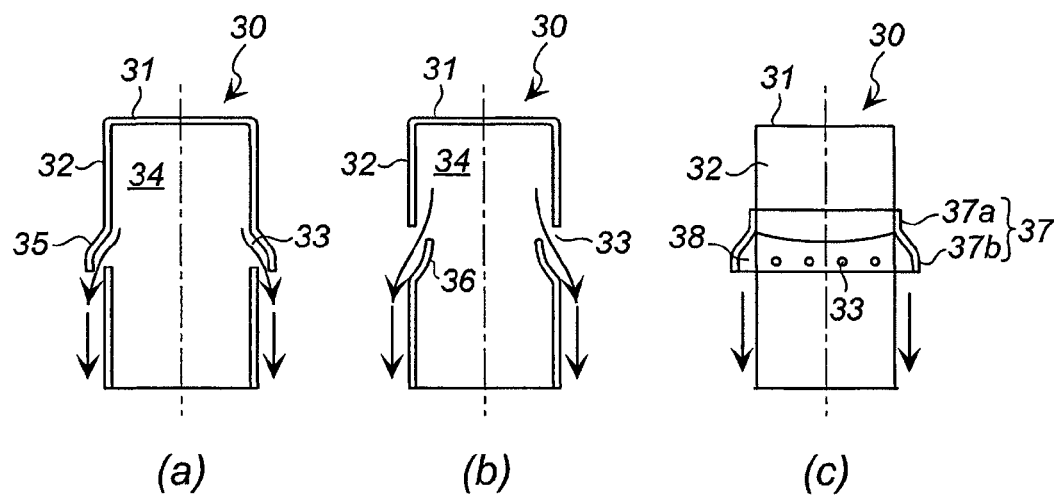
FIG. 4 shows, in (a), an axial sectional view of the inner cylindrical member in FIG. 2, in (b), an axial sectional view of an inner cylindrical member according to another embodiment, and, in (c), a front view of an inner cylindrical member according to yet another embodiment (showing a state of the inner cylinder without a part of a guide member)

The guide member 35 shown in (a) in FIG. 4 protrudes downward from the outer side of circumferential wall 32 (the circumferential wall 432 shown in FIG. 1) of an inner cylindrical member 430 so as to cover the top and the outside of the nozzles 33.

The guide member 35 may be in any form as long as the guide member 35 acts to allow combustion products, which are discharged from the nozzles 33, to flow toward the bottom plate 422 along the circumferential wall 432.

In (a) in FIG. 4, the guide member 35 is formed to cover, from outside, each nozzle 33 and protrudes to the combustion chamber 440 so that only the lower part of the guide member 35 (in the bent portion 430b side) is opened.

Such a guide member 35 is formed by making an incision on the circumferential wall 32 of the inner cylindrical member 30 and then extruding an upper part of the incision from the inside of the inner cylindrical member toward the outside.

A port 35a is formed by an outer surface of the circumferential wall 32 of the inner cylindrical member and the guide member 35. The port 35a functions as an outlet through which combustion products are discharged from the inside of the inner cylindrical member 30 during actuation.

In the outlet (an opening) 35a for combustion products, the height position thereof in the axis X direction (the position where the outlet 35a is formed) can be adjusted by increasing or reducing the length in the axis X direction of the guide member 35, without changing the positions of the nozzles 33.

Because the outlet (the opening) 35a for combustion products is formed closer to the bottom plate 422 than to the gas discharge port 414, there is a difference in height in the axis X direction between the outlet 35a and the gas discharge port 414.

The plurality of nozzles are accompanied by a guide member for each nozzle, as shown above. They may alternatively be covered with an annular guide member, for example being a cylindrical cover member that is placed on the circumferential wall 32, to form an annular outlet of the combustion product.

The inner cylindrical member 430 of the gas generator 400 shown in FIG. 1 may have a guide member 36 shown in (b) in FIG. 4.

The guide member 36 shown in (b) in FIG. 4 protrudes upward in the inside of the circumferential wall of the inner cylindrical member so as to cover, from below and inside, the nozzles 33 formed in the circumferential wall (the circumferential wall 432 shown in FIG. 1).

Such a guide member 36 is formed by making an incision on the circumferential wall 32 of the inner cylindrical member 30 and then extruding a lower part of the incision from the outside of the inner cylindrical member toward the inside.

When the guide member 36 is formed in the inside of the inner cylinder circumferential wall 32, the nozzles 33 serves as outlets for combustion products to be discharged from the inner cylindrical member 30 during actuation.

Because the nozzles 33 are formed closer to the bottom plate 422 than to the gas discharge port 414, there is a difference in height in the axis X direction between the gas discharge port 414 and the nozzles 33 serving as the outlet for combustion products in FIG. 1.

The inner cylindrical member 430 of the gas generator 400 shown in FIG. 1 may have a guide member 37 shown in (c) in FIG. 4.

The guide member 37 shown in (c) in FIG. 4 is a cylindrical cover member that is placed on the circumferential wall 32 of the inner cylindrical member (the circumferential wall 432 shown in FIG. 1) so as to cover, from above and outside, the nozzles 33 formed in the circumferential wall 32 (the circumferential wall 432 shown in FIG. 1).

The cylindrical cover member (guide member) 37 has an annular fixing portion 37a fixed to the circumferential wall 32 (the circumferential wall 432 shown in FIG. 1) and an enlarged diameter portion 37b that is opened outwardly in the shape of a bowl from the annular fixing portion 37a.

The cylindrical cover member (the guide member) 37 is press-fitted and fixed such that the annular fixing portion 37a is fixed above the nozzles 33 and the enlarged diameter portion 37b covers nozzles 33 from above and outside.

By attaching the cylindrical cover member (the guide member) 37 to the inner cylinder circumferential wall 32 (the circumferential wall 432 shown in FIG. 1), an annular discharge path (a outlet for combustion product) 38 is formed for discharging combustion products of the ignition chamber 34 (the ignition chamber 434 shown in FIG. 1).

In the outlet 38 for combustion product, a height position thereof in the axis X direction (the position where the outlet 38 for combustion products is formed) can be adjusted by increasing or reducing the length in the axis X direction of the cylindrical cover member (the guide member) 37, without changing the positions of the nozzles 33.

Because the outlet 38 for combustion products is formed closer to the bottom plate 422 than to the gas discharge port 414, there is a difference in height in the axis X direction between the outlet 38 for combustion products and the gas discharge port 414.

Note that "press-fitted and fixed" in the present invention means that two members to be fitted to each other are in close contact with and strongly attached to each other by adjusting the diameters thereof.

The outside of the inner cylindrical member 430 is the combustion chamber 440. The combustion chamber 440 is charged with a gas generating agent 441.

A radially inside portion of the combustion chamber 440 is defined by the circumferential wall 432 of the inner cylindrical member, and a radially outside portion of the same is defined by the circumferential wall portion 423 of the second shell and an annular filter 470.

The annular filter 470 is disposed in the top plate 412 side of the combustion chamber 440. In the annular filter 470, an outer circumferential surface 471 faces the gas discharge port 414 (the seal tape 415), with a space therebetween, and an inner circumferential surface 472 faces the circumferential wall 432 of the inner cylindrical member 430.

Moreover, in the annular filter 470, an upper annular surface 473 abuts against the top plate 412, and a lower annular surface 474 is supported by a substantially annular retainer 477. The substantially annular retainer 477 is attached to the annular step surface 421a.

Operations of the gas generator 400 shown in FIG. 1 will be described below. Note that the inner cylindrical member 430 will be described as having the guide member 35 shown in (a) in FIG. 4; however, the gas generator 400 operates in the same way with the guide members shown in (b) and (c) in FIG. 4.

The igniter 416 is actuated to ignite and burn the gas generating agent (the transfer charge) stored in the ignition chamber 434.

Combustion products generated inside the ignition chamber 434 are discharged from the nozzles 33 of the inner cylindrical member 430, and by the guide member 35, the combustion products flow toward the bottom plate 422 along the circumferential wall 432.

Because the combustion products flow toward the bottom plate 422 along the circumferential wall 432 as described above, the combustion products flow in a direction substantially parallel to the central axis of the gas generator 400 (the central axis X shown in FIG. 1) to reach the bottom plate 422. Subsequently, the combustion products move in a radiation direction along the bottom plate 422, collides with the circumferential wall portion 423 of the second shell 421, and turns around to flow toward the top plate 412 (the filter 470).

In the course of the flow of the combustion products described above, the gas generating agent 441 that is charged in the combustion chamber 440 comes into contact with the combustion products and burns, and then the adjacent gas generating agent 441 burns sequentially toward the top plate 412 (toward the gas discharge port 414).

The combustion gas in the combustion chamber 440 passes through the annular filter 470 and then flows into a cylindrical gap 460. Thereafter, the combustion gas breaks the seal tape 415 and is discharged from the gas discharge port 414.

In the gas generator 400 shown in FIG. 1, because of a combination of the guide member 35 provided in the inner cylindrical member 430, the height positions of each nozzle 33 and the gas discharge port 414, and the cylindrical gap 460, the ignition performance and the combustion performance of the entire gas generating agent 441 inside the combustion chamber 440 are improved.

Figure 2:
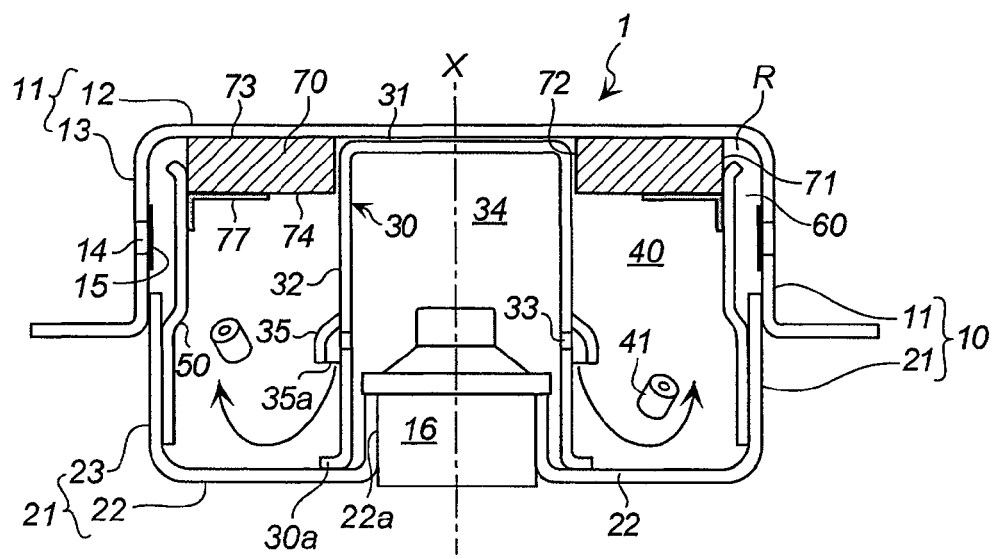
FIG. 2 shows a cross-sectional view in the central axis X direction of a gas generator according to another embodiment of the present invention.

(2) Gas Generator of FIG. 2

An outer shell container of a gas generator 1 is formed by a housing 10.

The housing 10 includes a first shell 11 having a top plate 12 and a circumferential wall portion 13, and a second shell 21 having a bottom plate 22 and a circumferential wall portion 23. The second shell 21 is fitted into the first shell 11, and the contact portion therebetween is fixed by welding.

The first shell 11 has a gas discharge port 14 formed at its circumferential wall portion 13 in the vicinity of the top plate 12. The gas discharge port 14 is closed with a metallic seal tape 15 from the inside.

An inner cylindrical member 30 and an outer cylindrical member 50 are disposed in the housing 10 so as to be concentric with the housing central axis X.

In the inner cylindrical member 30, a bottom surface 31 abuts against the top plate 12, and an opening covers a cylindrical portion 22a that is provided such that a hole is formed in a central portion of the bottom plate 22 of the second shell.

In the inner cylindrical member 30, a flange portion 30a at the opening is fixed to the bottom plate 22 of the second shell by welding.

The inside of the inner cylindrical member 30 is an ignition chamber 34. The ignition chamber 34 accommodates an igniter 16 that has been inserted from the opening. The remaining space is charged with a gas generating agent (a transfer charge), not shown in the drawing.

Figure 3:
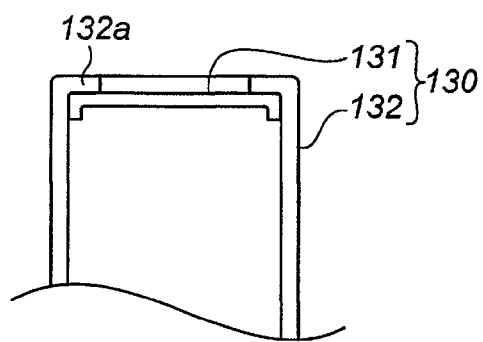
FIG. 3 shows a cross-sectional view in the central axis X direction of an inner cylindrical member of a different embodiment from the one shown in FIG. 2.

In place of the inner cylindrical member shown in FIG. 2, an inner cylindrical member 130 shown in FIG. 3 can be used as the inner cylindrical member 30.

The inner cylindrical member 130 is in the shape of a cup in which an opening at one end of a cylindrical main body 132 is closed with a lid portion 131.

In terms of facilitating charging of the transfer charge (the gas generating agent), it is preferred that the lid portion 131 be attached to the inner cylindrical member 130 shown in FIG. 3 after the transfer charge (the gas generating agent) is charged inside the inner cylindrical member 130. After charging operation, the lid portion 131 is attached to the inner cylindrical member 130, and then an opening of the cylinder main body 132 on the lid 131 side is folded inward to form an annular bent portion 132a, thereby fixing the lid portion 131.

A plurality of nozzles 33 are formed on the circumferential wall 32 of the inner cylindrical member 30.

The plurality of nozzles 33 are formed in a position facing (radially opposite to) a circumferential wall of the outer cylindrical member 50, in a staggered (zig zag) manner at equal intervals in a circumferential direction. Therefore, there is a difference in height between the position of the gas discharge port 14 and the position of each nozzle 33 in the central axis X direction.

Further, a guide member 35 shown in (a) in FIG. 4, being the same as the one of the gas generator 400 shown in FIG. 1, is formed on the circumferential wall 32.

An port 35a, formed by an outer surface of the circumferential wall 32 of the inner cylindrical member and the guide member 35, functions as an outlet for discharging combustion products from the inside of the inner cylindrical member 30 during actuation.

In the outlet for combustion products (the opening) 35a, the height position thereof in the axis X direction (the position where the opening 35a is formed) can be adjusted by increasing or reducing the length in the axis X direction of the guide member 35, without changing the positions of the nozzles 33.

Because the outlet for combustion products (the opening) 35a is formed closer to the bottom plate 22 than to a first communication path R, there is a difference in height in the axis X direction between the opening 35a and the first communication path R.

The inner cylindrical member 30 of the gas generator 1 shown in FIG. 2 may have the guide member 36 shown in (b) in FIG. 4 or the guide member 37 shown in (c) in FIG. 4, as with the gas generator 400 shown in FIG. 1.

In (b) in FIG. 4, when the guide member 36 is formed inside the inner cylinder circumferential wall 32, each of the nozzles 33 functions as the outlet for combustion products to be discharged from the inner cylindrical member 30 during actuation.

Because the nozzles 33 are formed closer to the bottom plate 22 than to the first communication path R, there is a difference in height in the axis X direction between the first communication path R and the nozzles 33 serving as the outlet for combustion products in FIG. 2.

In (c) in FIG. 4, an annular discharge path (outlet for combustion products) 38 is formed for discharging combustion products in the ignition chamber 34. There is a difference in height in the axis X direction between the outlet 38 for combustion products and the first communication path R.

The outside of the inner cylindrical member 30 is a combustion chamber 40. The combustion chamber 40 is charged with a gas generating agent 41.

A radially inside portion of the combustion chamber 40 is defined by the circumferential wall 32 of the inner cylindrical member, and a radially outside portion of the same is defined by the outer cylindrical member 50. The outer cylindrical member 50 is disposed so as to form a cylindrical gap 60 together with the circumferential wall portion 13 of the first shell and the circumferential wall portion 23 of the second shell.

The cylindrical gap 60 is communicated with the gas discharge port 14.

The combustion chamber 40 and the cylindrical gap 60 are communicated with each other only by the first communication path R formed between the outer cylindrical member 50 and the top plate 12.

Figure 5:
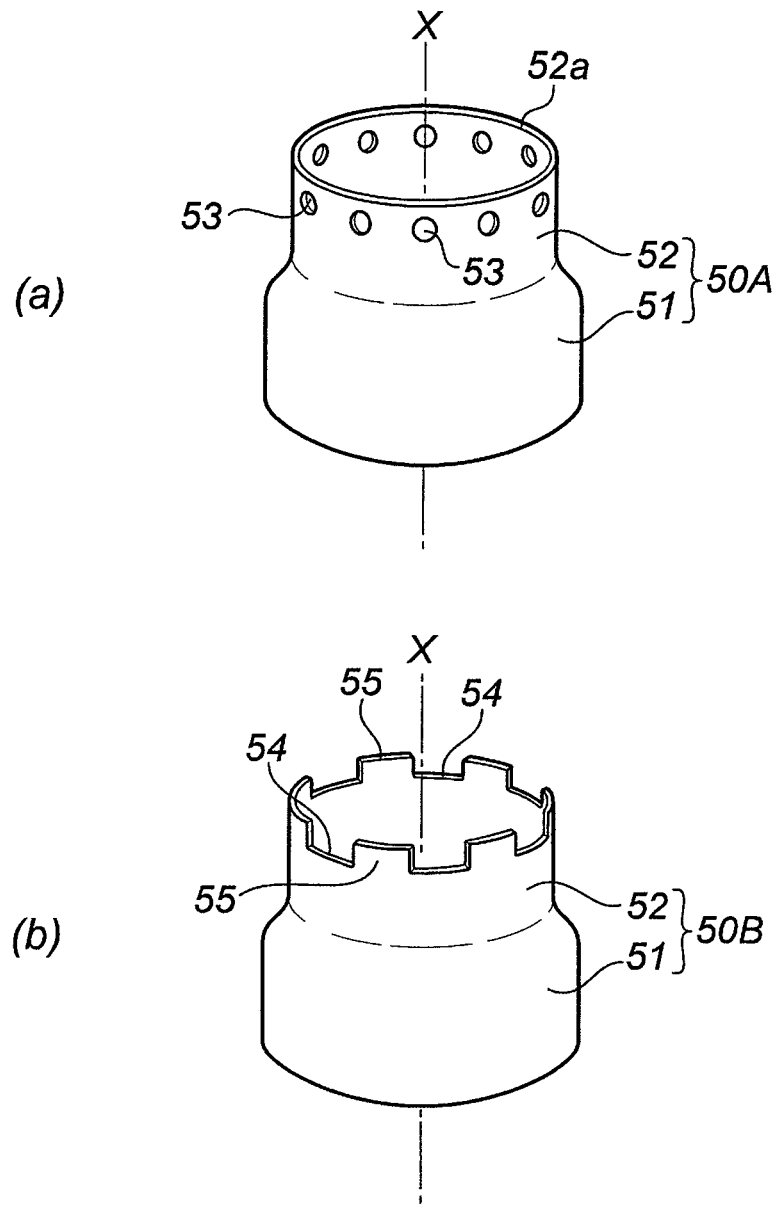
FIG. 5 shows, in (a), a perspective view of an outer cylindrical member in FIG. 2 and, in (b), a perspective view of an outer cylinder of another embodiment.

An outer cylindrical member shown in (a) in FIG. 5 or (b) in FIG. 5 can be used as the outer cylindrical member 50 in FIG. 2.

The outer cylindrical member 50A shown in (a) in FIG. 5 has a large-diameter cylindrical wall portion 51 and a small-diameter cylindrical wall portion 52 smaller than the large-diameter cylindrical wall portion 51.

When the outer cylindrical member 50A is disposed in the gas generator 1 shown in FIG. 2, an outer circumferential surface of the large-diameter cylindrical wall portion 51 is in contact with the circumferential wall portion 23 of the second shell, and a peripheral edge 52a of an opening of the small-diameter cylindrical wall portion 52 abuts against the top plate 12.

The outer cylindrical member 50A has a plurality of communication holes 53 formed in the vicinity of the opening of the small-diameter cylindrical wall portion 52. The plurality of communication holes 53 serves as the first communication path R shown in FIG. 2.

The outer cylindrical member 50B shown in (b) in FIG. 5 has a large-diameter cylindrical wall portion 51 and a small-diameter cylindrical wall portion 52 smaller than the large-diameter cylindrical wall portion 51.

A plurality of concave portions 54 which are dented in a height direction (the axis X direction), and a plurality of undented portions (convex portions 55) are formed at an opening of the small-diameter cylindrical wall portion 52. The concave portions 54 and the convex portions 55 are disposed alternately in the circumferential direction.

When the outer cylindrical member 50B is disposed in the gas generator 1 shown in FIG. 2, an outer circumferential surface of the large-diameter cylindrical wall portion 51 is contact with the circumferential wall portion 23 of the second shell, and the convex portions 55 of the small-diameter cylindrical wall portion 52 abuts against the top plate 12.

In the above state, a plurality of holes (square holes, in case of using the outer cylindrical member 50B shown in (b) in FIG. 5) are formed by the concave portions 54, the convex portions 55 and the top plate 12. These square holes serve as the first communication path R shown in FIG. 2.

In place of the outer cylindrical members shown in (a) and (b) in FIG. 5, the one without the communication holes 53 shown in (a) in FIG. 5 or the one without the concave portions 54 and the convex portions 55 shown in (b) in FIG. 5 can be used as the outer cylindrical member 50. When such an outer cylindrical member is used, the outer cylindrical member is disposed to form a gap between the outer cylindrical member and the top plate 12. This gap serves as the first communication path R shown in FIG. 2.

The gas generator 1 shown in FIG. 2 has an annular filter 70 disposed in the top plate 12 side in the combustion chamber 40.

In the annular filter 70, an outer circumferential surface 71 abuts against a part of an inner surface of the small-diameter cylindrical wall portion 52, and an inner circumferential surface 72 faces the circumferential wall 32 of the inner cylindrical member, with a small gap therebetween. This gap facilitates assembling of the filter.

Furthermore, in the annular filter 70, an upper annular surface 73 abuts against the top plate 12, and a lower annular surface 74 is disposed to face the combustion chamber 40.

A part of the lower annular surface 74 is supported by an annular retainer 77 that is press-fitted to the outer cylindrical member 50 (the small-diameter cylindrical wall portion 52).

The combustion chamber 40 and the cylindrical gap 60 are communicated with each other by the annular filter 70 and the first communication path R (the plurality of communication holes 53 shown in (a) in FIG. 5).

Operations of the gas generator 1 shown in FIG. 2 are will be described below. Note that the inner cylindrical member 30 will be described as the one shown in (a) in FIG. 4; however, the gas generator 1 operates in the same way with the inner cylindrical members shown in (b) and (c) in FIG. 4.

The igniter 16 actuated to ignite and burn the gas generating agent (the transfer charge) stored in the ignition chamber 34.

Combustion products generated inside the ignition chamber 34 are discharged from the nozzles 33 of the inner cylindrical member 30, and by the guide member 35, the combustion products flow toward the bottom plate 22 along the circumferential wall 32.

Because the combustion products flow toward the bottom plate 22 along the circumferential wall 32 as described above, the combustion products flow in a direction substantially parallel to the central axis of the gas generator 1 (the central axis X shown in FIG. 2) to reach the bottom plate 22. Subsequently, the combustion products move radially along the bottom plate 22, collides with the outer cylindrical member 50, and turns around to flow toward the top plate 12.

In the course of the flow of the combustion products described above, the gas generating agent 41 charged in the combustion chamber 40 comes into contact with the combustion products and burns, and then the adjacent gas generating agent 41 is burned sequentially toward the top plate 12 (toward the first communication path R).

The combustion gas in the combustion chamber 40 passes through the annular filter 70 and then flows into the cylindrical gap 60 via the first communication path R (the plurality of communication holes 53 shown in (a) in FIG. 5). Thereafter, the combustion gas breaks the seal tape 15 and is discharged from the gas discharge port 14.

In the gas generator 1 shown in FIG. 2, because of a combination of the guide member 35 provided in the inner cylindrical member 30, the height positions of each nozzle 33 and the first communication path R, the first communication path R (the communication holes 53), and the cylindrical gap 60, the ignition performance and the combustion performance of the entire gas generating agent 41 in the combustion chamber 40 are improved.

Figure 6:
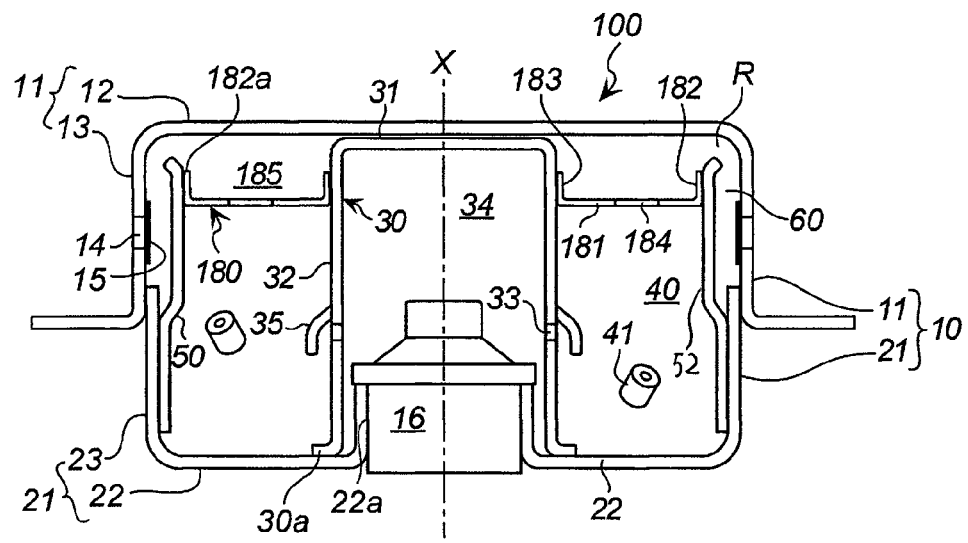
FIG. 6 shows a cross-sectional view in the central axis X direction of a gas generator according to yet another embodiment of the present invention.

(3) Gas Generator of FIG. 6

A gas generator 100 shown in FIG. 6 is same as the gas generator 1 shown in FIG. 2, except that a substantially annular member 180 is disposed in place of a combination of the annular filter 70 and the retainer 77 of the gas generator 1.

The substantially annular member 180 includes an annular bottom surface 181 provided with a plurality of communication holes 184, an external annular wall surface 182 formed in an outer circumference of the annular bottom surface, and an internal annular wall surface 183 formed in an inner circumference of the annular bottom surface.

The substantially annular member 180 is press-fitted and fixed to the outer cylindrical member 50 such that the external annular wall surface 182 abuts against the outer cylindrical member 50 (the small-diameter cylindrical wall portion 52), that the internal annular wall surface 183 faces the circumferential wall 32 of the inner cylindrical member, and that the annular bottom surface 181 faces the combustion chamber 40.

A distal end portion 182a of the external annular wall surface 182 is set to be lower than the outer cylindrical member 50 (the small-diameter cylindrical wall portion 52). Therefore, the first communication path R is formed by the top plate 12 and the outer cylindrical member 50 (the small-diameter cylindrical wall portion 52).

By disposing the substantially annular member 180 in the manner shown in FIG. 6, an annular space 185, surrounded by the top plate 12, the external annular wall surface 182, the annular bottom surface 181, the internal annular wall surface 183, and the circumferential wall 32 of the inner cylindrical container, is obtained.

In the gas generator 100 shown in FIG. 6, the combustion chamber 40 and the cylindrical gap 60 are communicated to each other by the communication holes (the second communication path) 184 of the substantially annular member 180, the annular space 185 and the first communication path R.

In the gas generator 100 shown in FIG. 6, combustion gas inside the combustion chamber 40 flows into the cylindrical gap 60 after passing through the communication holes (the second communication path) 184 of the substantially annular member 180, the annular space 185 and the first communication path R. And then, the combustion gas breaks the seal tape 15, and is discharged from the gas discharge port 14.

Figure 7:
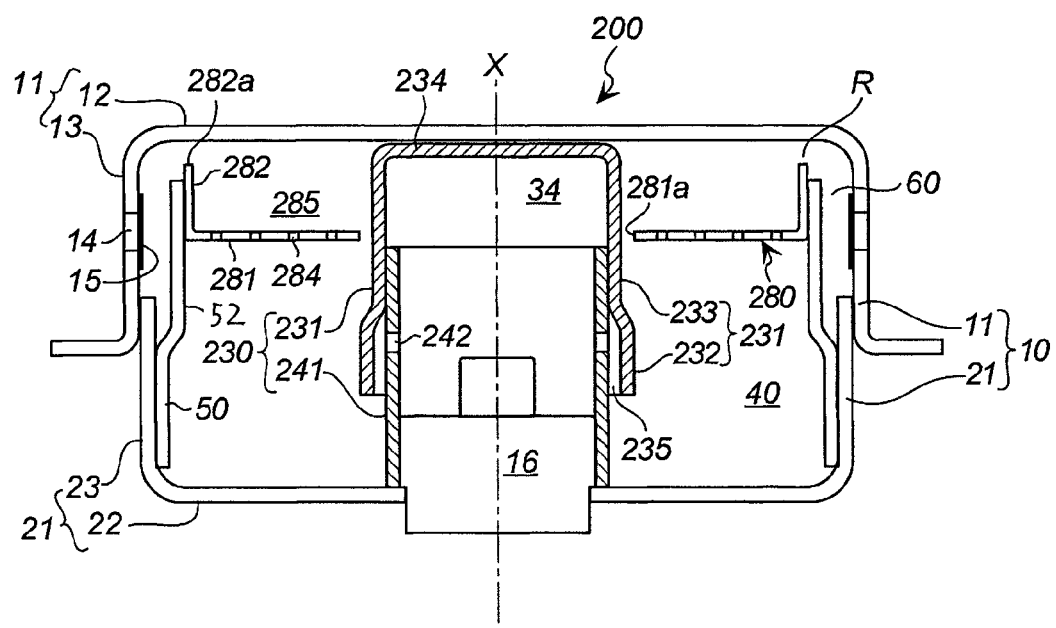
FIG. 7 shows a cross-sectional view in the central axis X direction of a gas generator according to yet another embodiment of the present invention.

(3) Gas Generator of FIG. 7

A gas generator 200 shown in FIG. 7 is same as the gas generator 100 shown in FIG. 6, except that an inner cylindrical member and a substantially annular member are different from those of the gas generator 100. A guide member of the inner cylindrical member of the gas generator 200 is similar to the one shown in (c) in FIG. 4.

An inner cylindrical member 230 is formed by a combination of an upper cup 231 and a lower cylinder 241.

The lower cylinder 241 has a uniform diameter and is fitted and fixed to an igniter collar of the igniter 16. And the lower cylinder 241 has an opening in the bottom plate 22 side (lower opening) and the opening is closed by the igniter 16. The lower cylinder 241 has a plurality of nozzles 242.

The upper cup 231 has a large-diameter portion 232 and a small-diameter portion 233, and the opening thereof covers the upper opening of the lower cylinder 241.

An inner diameter of the small-diameter portion 233 of the upper cup is set to be substantially equal to an outer diameter of the lower cylinder 241. Consequently, the upper cup 231 is press-fitted and fixed to the lower cylinder 241, and a bottom surface 234 the upper cup abuts against the top plate 12.

The larger-diameter portion 232 of the upper cup is positioned to radially face the nozzles 242 of the lower cylinder. Thus, when combining the upper cup 231 and the lower cylinder 241, the large-diameter portion 232 serves as a guide member, and an annular discharge path 235 for discharging combustion products in the ignition chamber 34 is formed.

A substantially annular member 280 includes an annular bottom surface 281 provided with a plurality of communication holes 284 and an external annular wall surface 282 formed in an outer circumference of the annular bottom surface.

The substantially annular member 280 is press-fitted and fixed to the outer cylindrical member 50 such that the external annular wall surface 282 abuts against the outer cylindrical member 50 (the small-diameter cylindrical wall portion 52), and that the annular bottom surface 181 faces the combustion chamber 40.

An inner peripheral edge 281a of the annular bottom surface 281 is arranged to form a gap together with the inner cylindrical member 230 (the upper cup 231), but the inner peripheral edge 281a may abut against the inner cylindrical member 230.

A distal end portion 282a of the external annular wall surface 282 is set to be higher than the outer cylindrical member 50 (the small-diameter cylindrical wall portion 52). Consequently, the first communication path R is formed by the top plate 12 and the external annular wall surface 282.

In the gas generator 200 shown in FIG. 7, the combustion gas inside the combustion chamber 40 flows into the cylindrical gap 60 after passing through the communication holes (the second communication path) 284 of the substantially annular member 280, the annular space 285 and the first communication path R, then breaks the seal tape 15, and is then discharged from the gas discharge port 14.

Figure 8:
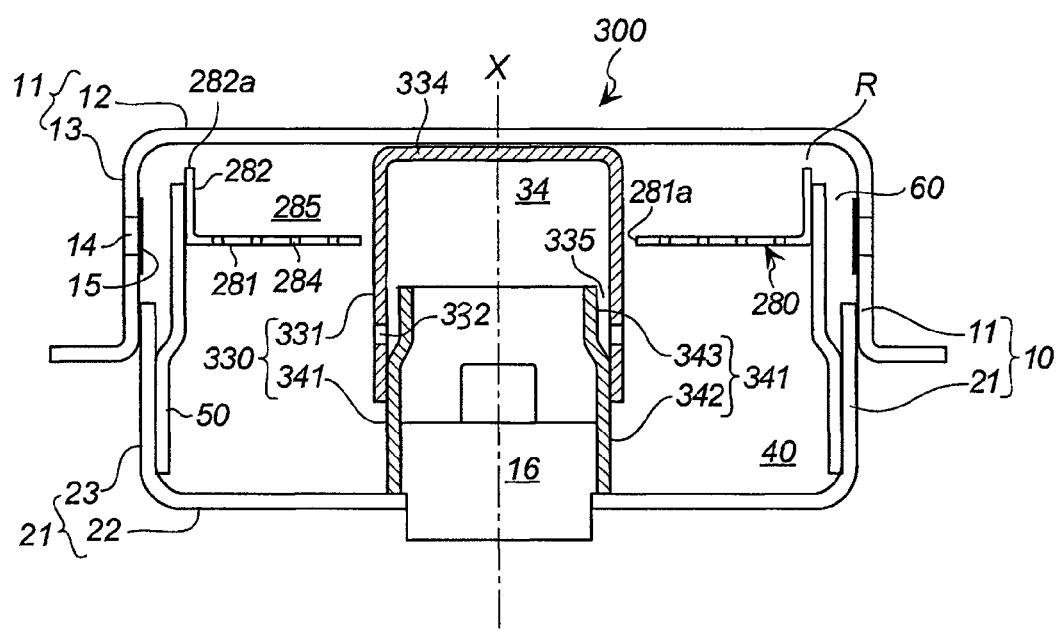
FIG. 8 shows a cross-sectional view in the central axis X direction of a gas generator according to yet another embodiment of the present invention.

(4) Gas Generator of FIG. 8

A gas generator 300 shown in FIG. 8 is same as the gas generator 200 shown in FIG. 7, except that an inner cylindrical member is different from that of the gas generator 200. A guide member of the inner cylindrical member is similar to the one shown in (b) in FIG. 4.

An inner cylindrical member 330 is formed by a combination of an upper cup 331 and a lower cylinder 341.

The lower cylinder 341 has a large-diameter cylindrical portion 342 and a small-diameter cylindrical portion 343, and is fitted and fixed into the ignition collar of the igniter 16, and an opening of the large-diameter cylinder portion 342 is closed with the igniter 16.

The upper cup 331 has a uniform diameter and covers the small-diameter cylinder portion 343 side of the lower cylinder 341.

An inner diameter of the upper cup 331 is set to be substantially equal to an outer diameter of the large-diameter cylindrical portion 342 of the lower cylinder. Thus, the upper cup 331 is press-fitted and fixed to the lower cylinder 341, and a bottom surface 334 abuts against the top plate 12.

A circumferential wall of the upper cup 331 is provided with a plurality of nozzles 332.

The small-diameter cylinder portion 343 of the lower cylinder is positioned to radially face the nozzles 342 of the upper cup 331. Thus, when combining the upper cup 331 and the lower cylinder 341, the smaller-diameter cylinder portion 343 functions as a guide member, and an annular internal discharge path 335, for discharging combustion products in the ignition chamber 34 from the nozzles 342, is formed.

In the gas generator 300 shown in FIG. 8, combustion gas inside the combustion chamber 40 flows into the cylindrical gap 60 after passing through the communication holes (the second communication path) 284 of the substantially annular member 280, the annular space 285, and the first communication path R, then breaks the seal tape 15, and is then discharged from the gas discharge port 14.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing including,
   a first shell having a top plate and a first circumferential wall portion,
   a second shell having a bottom plate and a second circumferential wall portion, and
   a gas discharge port formed in the top plate or first circumferential wall portion;
an inner cylindrical member disposed inside the housing, and defining an ignition chamber therein and a combustion chamber in an outside thereof;
the inner cylindrical member including,
   a first end, which is closed,
   a second end, opposite to the first end, which is closed by the ignition device attached thereto,
   a plurality of nozzles, provided in a circumferential wall of the inner cylindrical member, that communicates the ignition chamber and the combustion chamber,
   a guide member provided at least in an outer side or an inner side of the circumferential wall, so that combustion products generated inside the ignition chamber are discharged from the nozzles and guided towards the bottom plate of the second shell;
the combustion chamber including,
   a radially inside portion defined by the circumferential wall of the inner cylindrical member,
   a radially outside portion defined by at least the second circumferential wall portion, and
   an outlet that discharges combustion products from the inner cylindrical member during actuation, being formed closer to the bottom plate than to the gas discharge port, the outlet being defined by the inner cylindrical member and the guide member and the outlet maintaining an open state prior to and during an actuation of the gas generator, and
   a solid gas generating agent that generates combustion gas.

2. A gas generator, comprising:
a housing including,
   a first shell having a top plate and a first circumferential wall portion,
   a second shell having a bottom plate and a second circumferential wall portion, and
   a gas discharge port formed in the top plate or the first circumferential wall portion;
an inner cylindrical member disposed inside the housing, and defining an ignition chamber therein and a combustion chamber in an outside thereof,
the inner cylindrical member including,
   a first end, which is positioned in a side of the top plate side and closed,
   a second, opposite to the first end, which is closed by an ignition device attached thereto,
   a plurality of nozzles, provided in a circumferential wall of the inner cylindrical member, that communicates the ignition chamber and the combustion chamber,
   a guide member provided at least in an outer side or an inner side of the circumferential wall, so that combustion products generated inside the ignition chamber are discharged from the nozzles and guided towards the bottom plate of the second shell;
the combustion chamber including,
   a radially inside portion defined by the circumferential wall of the inner cylindrical member, and
   a radially outside portion defined by an outer cylindrical member, the outer cylindrical member being arranged to form a cylindrical gap between the outer cylindrical member and the first circumferential wall portion and the second circumferential wall portion;
   the cylindrical gap communicating with the gas discharge port,
   a first communication path formed between the outer cylindrical member and the top plate, communicating the combustion chamber with the cylindrical gap,
   an outlet that discharges combustion products from the inner cylindrical member during actuation, being formed closer to the bottom plate than to the first communication path, the outlet being defined by the inner cylindrical member and the guide member and the outlet maintaining an open state prior to and during an actuation of the gas generator, and
   a solid gas generating agent that generates combustion gas.

3. The gas generator according to claim 2, wherein
the outer cylindrical member has a large-diameter cylindrical wall portion and a small-diameter cylindrical wall portion with an outer diameter smaller than an outer diameter of the large-diameter cylindrical wall portion,
the large-diameter cylindrical wall portion has an outer circumferential surface abutting against the second circumferential wall portion, and the small-diameter cylindrical wall portion opposing the first circumferential wall portion,
the cylindrical gap is defined between the small-diameter cylindrical wall portion and at least the first circumferential wall portion, and
the first communication path is defined by a plurality of communication holes formed in a vicinity of the opening of the small-diameter cylindrical wall portion.

4. The gas generator according to claim 2, wherein
the outer cylindrical member has a large-diameter cylindrical wall portion and a small-diameter cylindrical wall portion with an outer diameter smaller than an outer diameter of the large-diameter cylindrical wall portion,
the large-diameter cylindrical wall portion has an outer circumferential surface abutting against the second circumferential wall portion, and the small-diameter cylindrical wall portion has an opening abutting against the top plate,
the cylindrical gap is defined between the small-diameter cylindrical wall portion and at least the first circumferential wall portion, and
the first communication path is formed by a communication hole defined by a plurality of concave portions and the top plate, the concave portions being formed by denting a circumferential wall of the outer cylindrical member at the opening of the small-diameter cylindrical wall portion in a height direction.

5. The gas generator according to claim 2, wherein
the outer cylindrical member has a large-diameter cylindrical wall portion and a small-diameter cylindrical wall portion with an outer diameter smaller than an outer diameter of the large-diameter cylindrical wall portion,
the large-diameter cylindrical wall portion has an outer circumferential surface abutting against the second circumferential wall portion, and the small-diameter cylindrical wall portion has an opening facing the top plate with a space therebetween,
the cylindrical gap is formed between the small-diameter cylindrical wall portion and at least the first circumferential wall portion, and the first communication path is formed by the space between the opening of the small-diameter cylindrical wall portion and the top plate of the first shell.

6. The gas generator according to claim 2, wherein
an annular filter is disposed in a side of the top plate inside the combustion chamber,
the annular filter has an outer circumferential surface abutting against the outer cylindrical member, an inner circumferential surface abutting against the inner cylindrical member, one of annular surfaces abutting against the top plate, and the other of the annular surfaces facing the combustion chamber, and
the combustion chamber and the cylindrical gap are communicated with each other by the annular filter and the first communication path.

7. The gas generator according to claim 2, wherein
a substantially annular member is disposed in a side of the top plate inside the combustion chamber,
the substantially annular member has an annular bottom surface provided with a plurality of communication holes, an external annular wall surface formed in an outer circumference of the substantially annular member, and an internal annular wall surface formed in an inner circumference thereof,
the substantially annular member is fitted such that the external annular wall surface abuts against the outer cylindrical member, the internal annular wall surface faces the circumferential wall of the inner cylindrical member, and the annular bottom surface faces the combustion chamber,
the substantially annular member is disposed such that an annular space surrounded by the top plate, the external annular wall surface, the annular bottom surface and the inner cylindrical member is formed, and
the combustion chamber and the cylindrical gap are communicated with each other by a second communication path formed by the communication holes of the substantially annular member, the annular space and the first communication path.

8. The gas generator according to claim 2, wherein
a substantially annular member is disposed in a side of the top plate inside the combustion chamber,
the substantially annular member has an annular bottom surface provided with a plurality of communication holes, and an external annular wall surface formed in an outer circumference of the substantially annular member,
the substantially annular member is fitted such that the external annular wall surface abuts against the outer cylindrical member and the annular bottom surface faces the combustion chamber, and the substantially annular member is disposed such that an annular space is formed, surrounded by the top plate, the external annular wall surface, the annular bottom surface and the inner cylindrical member, and
the combustion chamber and the cylindrical gap are communicated with each other by a second communication path formed by the communication holes of the substantially annular member, the annular space and the first communication path.

9. The gas generator according to claim 1, wherein the guide member is a cover member that protrudes downward from the outer side of the circumferential wall of the inner cylindrical member so as to cover the nozzles from above and from outside,
a vertical position of the outlet, with respect to a height direction of the inner cylindrical member, for combustion products is determined by an axial length of the guide member, without changing the positions of the nozzles.

10. The gas generator according to claim 1, wherein the guide member is a cover member that protrudes upward in the inside of the circumferential wall of the inner cylindrical member so as to cover the nozzles from below and from inside.

11. The gas generator according to claim 1, wherein
the guide member is a cylindrical cover member placed around the inner cylindrical member so as to cover the nozzles from above and from outside,
the cylindrical cover member has an annular fixing portion to be fixed to the circumferential wall of the inner cylindrical member and an enlarged-diameter portion extending outward from the annular fixing portion, and
the annular fixing portion is fixed above the nozzles, and the enlarged-diameter portion covers the nozzles from above and from outside.

12. The gas generator according to claim 2, wherein the guide member is a cover member that protrudes downward from the outer side of the circumferential wall of the inner cylindrical member so as to cover the nozzles from above and from outside,
a vertical position of the outlet, with respect to a height direction of the inner cylindrical member, for combustion products is determined by an axial length of the guide member, without changing the positions of the nozzles.

13. The gas generator according to claim 2, wherein the guide member is a cover member that protrudes upward in the inside of the circumferential wall of the inner cylindrical member so as to cover the nozzles from below and from inside.

14. The gas generator according to claim 2, wherein
the guide member is a cylindrical cover member placed around the inner cylindrical member so as to cover the nozzles from above and from outside,
the cylindrical cover member has an annular fixing portion to be fixed to the circumferential wall of the inner cylindrical member and an enlarged-diameter portion extending outward from the annular fixing portion, and
the annular fixing portion is fixed above the nozzles, and the enlarged-diameter portion covers the nozzles from above and from outside.

15. The gas generator according to claim 1, wherein the guide member guides the combustion product discharged from the plurality of nozzles in a downward direction along an outer surface of the inner cylindrical member.

16. The gas generator according to claim 2, wherein the guide member guides the combustion product discharged from the plurality of nozzles in a downward direction along an outer surface of the inner cylindrical member.

* * * * *